United States Patent Office 2,705,214
Patented Mar. 29, 1955

2,705,214

CLOSTRIDIUM VACCINE AND METHOD OF MAKING

John H. Hink, Berkeley, Calif., assignor to Cutter Laboratories, Berkeley, Calif., a corporation of California No Drawing. Application December 28, 1950, Serial No. 203,230

3 Claims. (Cl. 167—78)

This invention relates to a method of obtaining concentrated antigenic fractions from *Clostridium chauvei* and/or *septicus* whole culture vaccines.

It is desirable to produce vaccines of these types in dry, solid form of sufficient stability and having a sufficiently high concentration of immunological activity to allow their use in pelleted form. The stability of such vaccines should be sufficient to permit storage of the pelleted product for a considerable length of time without substantial loss of immunological activity, and the concentration of immunological activity should be sufficiently great to provide a "cow dose" in a pellet of injectible size (not greater than 3/32 inch in diameter by 3/16 inch long).

Heretofore, difficulty has been encountered in producing satisfactory pellets because of the lack of an antigenic product having both the necessary stability and high concentration of immunological activity. For example, the assignee of the present application has made experimental pellets from its *Clostridium chauvei* whole culture vaccine adsorbed on aluminum hydroxide (Blacklegol). To obtain a pellet containing the antigenic equivalent of 5 ml. of Blacklegol (a dose necessary to give so-called "permanent immunity" to cows over six months old) it was found that a pellet of a size in the order of 1/8 inch in diameter by 1/4 inch long would have to be used. A pellet of this size would obviously be unacceptable for use in an injection gun.

It is an object of the present invention to provide a method of producing from *Clostridium chauvei* and/or *septicus* whole culture vaccines a solid, concentrated, stable antigenic fraction suitable for producing "cow dose" pellets.

This and other objects of the invention will be apparent from the ensuing description and the appended claims.

Briefly, in accordance with the objects of this invention whole culture *Clostridium chauvei* or *septicus* vaccine is produced in the usual manner and treated to kill the organisms, preferably with formaldehyde, but also by other suitable means such as heat. The formalized whole culture is then treated with acetone to precipitate the killed organisms as well as by-products of growth and some of the constituents of the medium. During the precipitation, the pH is maintained at 6.00±0.05 by the addition of 5 N HCl or 3 N NaOH. The precipitate is separated by centrifugation or other suitable means, washed with concentrated acetone, and air-dried.

More specifically and by way of example, this method as applied to the formalized whole culture vaccine of either organism is as follows: Completely mix the formalized vaccine at room temperature until a uniform suspension is obtained. To this suspension slowly add, with constant stirring, an equal volume of acetone. The pH of the suspension should be measured and adjusted to 6.00±0.05 while stirring, 5 N HCl and 3 N NaOH being suitable for this purpose. After so adjusting the pH, allow the suspension to stand for at least four hours, preferably at a temperature of +4° C. although temperatures as high as +25° C. and as low as —5° C. can be tolerated. To prevent evaporation of the suspension its container should be covered. After allowing the suspension to stand for four hours or so, recover the precipitate contained therein by syphoning or decanting off the supernatant and centrifuging the remainder of the suspension. The centrifuged precipitate should then be thoroughly washed with acetone and for this purpose a quantity of acetone equal to about 1/5 of the volume of the original formalized vaccine being processed should be adequate. The washed precipitate can then be vacuum dried at room temperature or dried by simply spreading it on a sheet of filter paper and allowing evaporation to take place.

If the above process has been carried out aseptically the resulting powder should be sterile and the recovery obtained should be about 1.1 to 1.4 gms. of solids per liter of the formalized vaccine processed. The resulting sterile antigen can then be stored in a cool place and if stored at a temperature in the range of +4° C. it can be held for at least one year without measurable loss of potency.

The product so produced is a white powder containing substantially all of the antigenic activity of the original bacterin. When this dry, concentrated, stable product is mixed with a suitable filler and binder, it readily can be formed into pellets of injectible size containing a "cow dose" of the antigen. The resulting pellets are moisture free, non-hygroscopic, and stable at room temperature.

Examples of suitable fillers are lactose, sucrose, and starch. Examples of suitable binders are "Carbowax 6000" (trade-mark of a product of Commercial Solvents Co.) identified chemically as a water soluble, high molecular weight polyethylene glycol, commercial glucose, gelatin, and gum acacia.

The pellets preferably contain from 15% to 20% of antigen, depending upon the activity of the antigen and the permissible pellet size. Two to eight per cent of binder is suitable, and the balance of the composition is the filler material. In the mix may also be included a small amount (approximately 0.5 per cent) of aluminum hydroxide to function as an astringent.

As stated, the method is applicable to *Clostridium chauvei* and *septicus* whole culture vaccines and may be applied to cultural filtrates, as well as to whole culture vaccines. Furthermore, the antigenic powders of both organisms may be combined, the combination of these organisms and their by-products of growth providing a more effective product than either alone. Also, it is feasible to process a mixture of the two formalized vaccines to produce a combination powder from which combination pellets can be made directly.

The manner of forming the pellets, the pellet size and the manner of administering the pellets, all follow standard practice. Preferably, however, the pellets should be no greater than 3/32 inch in diameter by 3/16 inch long.

It is thus apparent that I have provided a novel and useful method for concentrating vaccines and certain novel and useful products resulting therefrom. The method is characterized by simplicity, and serves to separate from whole culture vaccines and the like, a solid fraction highly concentrated in antigens. The yield is substantially 100% and the solid antigen fraction is sufficiently stable, non-hygroscopic, and concentrated in antigens, to be formed into a stable and non-hygroscopic pellet of injectible size providing a "cow dose."

Potency tests of the dry vaccine as above-produced have been made by the assignee of this application, and have established the fact that the dry product contains substantially 100% of the antigenic values contained in the liquid vaccine starting material.

By the use of pellets of this character, the mass inoculation of herds of cattle can be more easily effected than by the use of a liquid vaccine and if the pellets include aluminum hydroxide, they each give the same effect as several and separate injections of smaller doses.

While I have shown certain preferred forms of my invention, it is to be understood that various changes may be made therein by those skilled in the art without departing from the spirit of the invention as defined in the appended claims.

Having thus described my invention, what I claim and desire to secure by Letters Patent is:

1. A method of treating a killed liquid whole culture, selected from the class consisting of *Clostridium chauvei* culture and *Clostridium septicus* culture to produce a solid fraction characterized by stability and high immunological activity comprising: adding an equal volume of a water miscible, aliphatic ketone of low molecular weight to said killed whole culture while maintaining the pH of the resulting mixture at about pH 6 to precipitate substantially all of the immunological activity of the killed whole culture, and then separating and drying the resulting precipitate.

2. A method of treating a killed liquid whole culture, selected from the class consisting of *Clostridium chauvei* culture and *Clostridium septicus* culture to produce a solid fraction characterized by stability and high immunological activity comprising: adding an equal volume of acetone to said killed whole culture while maintaining the pH of the resulting mixture at about pH 6 to precipitate substantially all of the immunological activity of the killed whole culture, and then separating and drying the resulting precipitate.

3. The product resulting from the method of claim 1.

References Cited in the file of this patent

UNITED STATES PATENTS

| | | |
|---|---|---|
| 1,511,557 | Franklin | Oct. 14, 1924 |
| 2,125,533 | Winegarden | Aug. 2, 1938 |
| 2,340,318 | Gerlough | Feb. 1, 1944 |
| 2,385,443 | Hoffman | Sept. 25, 1945 |

OTHER REFERENCES

Burrows article in Proc. Soc. Expt'l. Biol. and Med., December 1944, pp. 306 to 311.

Morgan et al.: Article in Biochem. Journ., February 1940, pp. 169–173.

Walter: Article in Biochem. Journ., 1940, pp. 325 to 329.